(12) United States Patent
Fryxell et al.

(10) Patent No.: US 6,749,825 B2
(45) Date of Patent: Jun. 15, 2004

(54) MESOPOROUS CARBONATES AND METHOD OF MAKING

(75) Inventors: Glen Fryxell, Kennewick, WA (US); Jun Liu, Albuquerque, NM (US); Thomas S. Zemanian, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/139,408

(22) Filed: May 2, 2002

(65) Prior Publication Data

US 2003/0206851 A1 Nov. 6, 2003

(51) Int. Cl.[7] .............................................. C01B 31/24
(52) U.S. Cl. .................... 423/419.1; 423/105; 423/165; 423/186; 423/421; 423/430
(58) Field of Search ............................... 423/419.1, 430, 423/431, 432, 165, 105, 129, 186, 421

(56) References Cited

U.S. PATENT DOCUMENTS

| | | | | | |
|---|---|---|---|---|---|
| 4,900,533 A | * | 2/1990 | Malden | ........................ | 423/430 |
| 5,045,289 A | * | 9/1991 | Fernando et al. | ........... | 423/21.1 |
| 5,290,353 A | * | 3/1994 | Goffin et al. | ................ | 106/464 |
| 5,853,686 A | * | 12/1998 | Doxsee | ........................ | 423/430 |

* cited by examiner

Primary Examiner—Stuart L. Hendrickson
Assistant Examiner—Peter J Lish
(74) Attorney, Agent, or Firm—Douglas E. MiKinley, Jr.

(57) ABSTRACT

Mesoporous metal carbonate structures are formed by providing a solution containing a non-ionic surfactant and a calcium acetate salt, adding sufficient base to react with the acidic byproducts to be formed by the addition of carbon dioxide, and adding carbon dioxide, thereby forming a mesoporous metal carbonate structure containing the metal from said metal salt.

12 Claims, 1 Drawing Sheet

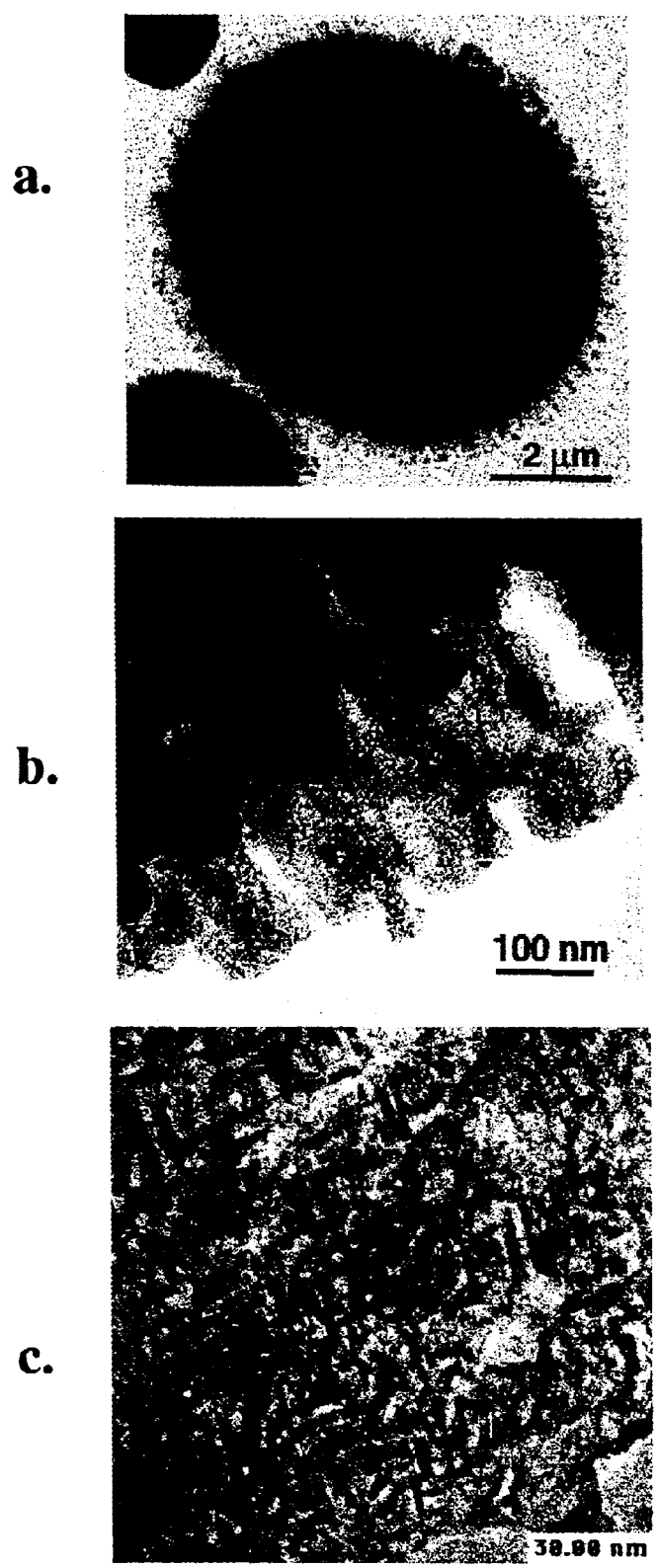

MESOPOROUS CARBONATES AND METHOD OF MAKING

CROSS-REFERENCE TO RELATED APPLICATIONS

Not Applicable

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

BACKGROUND OF THE INVENTION

The development of mesoporous materials has led to their use in a wide variety of chemical applications over the past several years. For example, mesoporous materials have been used on an industrial scale in catalytic cracking operations and other chemical processes. Despite these and other successful applications, the breadth of these applications has still been limited due to the fabrication techniques and the nature of the species commonly used to fabricate these materials. The fabrication techniques that have enabled the development of these high surface area materials (hydrolysis and condensation chemistry) have proven to be best suited for the preparation of nanostructured ceramic oxides. While ceramic oxide mesoporous materials have proven useful in a wide variety of applications, their usefulness does not cover the full range of potentially beneficial applications of mesoporous materials.

For example, in applications such as drug delivery, the relative insolubility of mesoporous silica can hamper the usefulness of the material where dissolution is desired. In contrast, due both to its ability to dissolve in a controlled manner in situ, and the ability of natural, biological processes to put the dissolved material to productive use, a mesoporous carbonate material has great potential as a next generation drug delivery system. Mesoporous carbonate materials could be used, for example, as a resorbable filler material during bone surgery, wherein the interior pores of the material are impregnated with analgesics, antibiotics, or other pharmaceuticals. The intraporous species could be released over time, as the carbonate material is dissolved by the body, affording a time released delivery. Other potential applications for mesoporous carbonate materials, which simultaneously take advantage of the geometrical properties of mesoporous materials and the physical and chemical properties of carbonates, include chemical and catalytic applications, and as negative substrates for forming other mesoporous structures. Thus, there exists a need for a method for fabricating mesoporous carbonate materials.

BRIEF SUMMARY OF THE INVENTION

Accordingly, it is an object of the present invention to provide mesoporous carbonate materials and a method for making the same. As used herein, "mesoporous" refers to materials that have a high surface area as a result of pores covering the surface of the materials. As further used herein, "mesoporous" generally refers to materials wherein these pores are generally between about 1 nanometer and about 15 nanometers, but should also be interpreted to include materials wherein these pores range from between about 1 nanometer up to about 100 nanometers.

The method for making mesoporous carbonate materials of the present invention involves first providing a solution containing a non-ionic surfactant and a metal salt having an organic counter ion. Carbon dioxide is reacted with the solution to form the metal carbonate structure, but prior to the addition of the carbon dioxide, a sufficient amount of base is added to react with the acidic byproducts that are formed by the addition of carbon dioxide. In this manner, the reaction is prevented from reversing as the metal carbonate structure is formed. Suitable bases include, but are not limited to, $NH_4OH$ In general, any non-ionic surfactant that will form a microemulsion in water and carbon dioxide is suitable for the method of the present invention. While not meant to be limiting, polyethyleneglycol was used as the surfactant in the preferred embodiment of the present invention set forth herein. Similarly, while the preferred embodiment of the present invention described herein utilized calcium and magnesium, other metals may be used in the practice of the present invention include the alkaline earth metals (Be, Mg, Ca, Sr, Ba, and Ra), transition metals such as Ni, Ti, and Zn, and alkali metals such as Li.

The mesoporous carbonate materials made by the method of the present invention may further be cleaned with a solvent, such as supercritical carbon dioxide (SCCO2). Preferred solvents should be capable of extracting the surfactant and resultant organic salt from the mesoporous carbonate product material. Thus, the use of both non-ionic surfactants and salts having an organic counter ion allows a single solvent, such as SCCO2, to perform the entire extraction in a single, elegant step.

The present invention allows the use of any organic counter ion. In the preferred embodiment described herein, the metal salt of calcium acetate was selected and acetate thus formed the organic counter ion. As indicated above, the selection of acetate as the organic counter ion was merely to facilitate the extraction of the reaction product with supercritical $CO_2$, and the invention should be broadly construed to contemplate the use of any organic counter ion, provided it is soluble in the solvent selected for extraction, as acceptable for practicing this aspect of the present invention.

Supercritical carbon dioxide (SCCO2) may fill both the role of a reactant and as a solvent for cleaning the final product. However, while some form of carbon dioxide is necessary to form the mesoporous carbonate structures, alternative solvents may be used in substitution for SCCO2. Nevertheless, due to the convenience of using SCCO2 as both a precursor to form the mesoporous carbonate structures and as a solvent for the extraction of the final product, SCCO2 is the preferred solvent.

BRIEF DESCRIPTION OF THE SEVERAL VIEWS OF THE DRAWING

FIGS. 1a, 1b, and 1c are photographs of mesoporous calcium carbonate fabricated according to the method of the present invention at progressively larger magnification.

DETAILED DESCRIPTION OF THE INVENTION

An experiment was undertaken to demonstrate the method of the present invention. 30 grams of polyethyleneglycol were mixed with 70 grams of water and 8.8 grams of calcium acetate. The resulting solution was then brought to approximately pH 11 by the addition of $NH_4OH$. 16 ml of this solution was then added to a cell, which was brought to 50° C. and 100 psi and then 7,500 psi by the addition of $CO_2$. The resultant mesoporous calcium carbonate material was then collected and washed with 5 ml of acetone. Finally, a dynamic extraction utilizing SCCO2 as the solvent was performed.

The process yielded 98.9% of the theoretical yield of calcium carbonate available. FIGS. 1 a), b), and c) show TEM analysis of the mesoporous calcium carbonate formed as described above at increasing magnifications. As can be seen in FIG. 1a, the materials formed into uniform spherical particles (approximately 5 microns in diameter) composed of radial spicules. Each of these spicules is perforated with 100 angstrom pores. The superstructure of each spicule is constructed from dense calcium carbonate rods that are approximately 30 angstroms in diameter and 200–300 angstroms long. Some of these rods are straight, and others are bent. The rods arise from the structure of the bi-continuous phase template. BET surface analysis of the mesoporous calcium carbonate revealed a very high surface area of 1774 $m^2/g$. The extremely high surface area, in conjunction with the 100 angstrom pore diameter indicates a very large void volume in which pharmaceuticals, such as analgesics, antibiotics, or other pharmaceuticals could be introduced.

XRD analysis indicated that this mesoporous material was composed of vaterite, which is the kinetic phase for calcium carbonate (calcite is the thermodynamically favored phase), consistent with rapid carbonate phase formation upon "carbonation" of the bi-continuous template.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for making a mesoporous metal carbonate structure comprising the steps of:
   a. providing a solution containing a non-ionic surfactant and a metal salt having an organic counter ion,
   b. adding sufficient base to react with the acidic byproducts to be formed by the addition of carbon dioxide, and
   c. adding carbon dioxide, thereby forming a mesoporous metal carbonate structure containing the metal from said metal salt.

2. The method of claim 1 further comprising the step of selecting said metal as an alkaline earth metal.

3. The method of claim 2 further comprising the step of selecting said alkaline earth metal from the group consisting of Be, Mg, Ca, Sr, Ba, and Ra.

4. The method of claim 1 further comprising the step of selecting said metal as a transition metal.

5. The method of claim 4 further comprising the step of selecting said transition metal from the group consisting of Ni, Ti, and Zn.

6. The method of claim 1 further comprising the step of selecting said metal as an alkali metal.

7. The method of claim 6 further comprising the step of selecting said alkali metal as Li.

8. The method of claim 1 further comprising the step of removing any residual non-ionic surfactant and organic counter ion by exposing the mesoporous metal carbonate structure to a solvent.

9. The method of claim 8 further comprising the step of removing any residual non-ionic surfactant and organic counter ion by exposing the mesoporous metal carbonate structure to a solvent selected as supercritical carbon dioxide.

10. A method for making a mesoporous metal carbonate structure comprising the steps of:
    a. providing a solution containing a non-ionic surfactant and a calcium acetate salt,
    b. adding sufficient base to react with the acidic byproducts to be formed by the addition of carbon dioxide, and
    c. adding carbon dioxide, thereby forming a mesoporous metal carbonate structure containing the metal from said metal salt.

11. The method of claim 10 further comprising the step of removing any residual non-ionic surfactant and organic counter ion by exposing the mesoporous metal carbonate structure to a solvent.

12. The method of claim 11 further comprising the step of removing any residual non-ionic surfactant and organic counter ion by exposing the mesoporous metal carbonate structure to a solvent selected as supercritical carbon dioxide.

* * * * *